US008135189B2

(12) United States Patent
Jerebko et al.

(10) Patent No.: US 8,135,189 B2
(45) Date of Patent: Mar. 13, 2012

(54) SYSTEM AND METHOD FOR ORGAN SEGMENTATION USING SURFACE PATCH CLASSIFICATION IN 2D AND 3D IMAGES

(75) Inventors: Anna Jerebko, West Chester, PA (US); Matthias Wolf, Coatesville, PA (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 724 days.

(21) Appl. No.: 12/243,327

(22) Filed: Oct. 1, 2008

(65) Prior Publication Data
US 2009/0092301 A1 Apr. 9, 2009

Related U.S. Application Data

(60) Provisional application No. 60/977,120, filed on Oct. 3, 2007.

(51) Int. Cl.
*G06K 9/00* (2006.01)
(52) U.S. Cl. ....................................................... 382/128
(58) Field of Classification Search .................. None
See application file for complete search history.

(56) References Cited

U.S. PATENT DOCUMENTS

| | | | | |
|---|---|---|---|---|
| 7,194,117 | B2 * | 3/2007 | Kaufman et al. | 382/128 |
| 7,536,041 | B2 * | 5/2009 | Pekar et al. | 382/128 |
| 7,545,979 | B2 * | 6/2009 | Fidrich et al. | 382/128 |
| 7,702,153 | B2 * | 4/2010 | Hong et al. | 382/128 |
| 7,876,934 | B2 * | 1/2011 | Georgescu et al. | 382/128 |
| 7,876,938 | B2 * | 1/2011 | Huang et al. | 382/128 |
| 2004/0125997 | A1 * | 7/2004 | Jacob et al. | 382/128 |
| 2006/0147114 | A1 * | 7/2006 | Kaus et al. | 382/173 |
| 2006/0159341 | A1 * | 7/2006 | Pekar et al. | 382/128 |
| 2007/0081712 | A1 * | 4/2007 | Huang et al. | 382/128 |

OTHER PUBLICATIONS

Breeuwer et al., "Segmentation of Thrombus in Abdominal Aortic Aneurysms From CTA With Nonparametric Statistical Grey Level Appearance Modeling", IEEE Transactions on Medical Imaging, IEEE Service Center, Piscataway, NJ, vol. 24, No. 4, Apr. 1, 2005, pp. 477-485.
Van Ginneken et al., "Active Shape Model Segmentation With Optimal Features", IEEE Transactions on Medical Imaging, IEEE Service Center, Piscataway, NJ, vol. 21, No. 8, Aug. 1, 2002, pp. 924-933.
Sukno et al., "Active Shape Models With Invariant Optimal Features: Application to Facial Analysis", IEEE Transactions on Pattern Analysis and Machine Intelligence, IEEE Service Center, Los Alamitos, CA, vol. 29, No. 7, Jul. 1, 2007, pp. 1105-1117.
Cootes et al., "Active appearance models", European Conference on Computer Vision, Berlin, DE, vol. 2, 1 Jan. 1998, pp. 484-499.
International Search Report including Notification of Transmittal of the International Search Report, International Search Report, and Written Opinion of the International Searching Authority.

* cited by examiner

*Primary Examiner* — Jermele M Hollington
(74) *Attorney, Agent, or Firm* — Peter Robert Withstandley

(57) ABSTRACT

A method for segmenting organs in digitized medical images includes providing a set of segmented training images of an organ, computing a surface mesh having a plurality of mesh cells that approximates a border of the organ, extracting positive examples of all mesh cells and negative examples in the neighborhood of each mesh cell which do not belong to the organ surface, training from the positive examples and negative examples a plurality of classifiers for outputting a probability of a point being a center of a particular mesh cell, computing an active shape model using a subset of center points in the mesh cells, generating a new shape by iteratively deforming the active shape model to fit a test image, and using the classifiers to calculate a probability of each center point of the new shape being a center of a mesh cell which the classifier was trained to recognize.

16 Claims, 3 Drawing Sheets

SYSTEM AND METHOD FOR ORGAN SEGMENTATION USING SURFACE PATCH CLASSIFICATION IN 2D AND 3D IMAGES

CROSS REFERENCE TO RELATED UNITED STATES APPLICATIONS

This application claims priority from "Organ segmentation using surface patch classification in 2D and 3D images", U.S. Provisional Application No. 60/977,120 of Jerebko, et al., filed Oct. 3, 2007, the contents of which are herein incorporated by reference in their entirety.

TECHNICAL FIELD

This disclosure is directed to techniques for organ segmentation in digital medical images, including, but not limited to, images of computed tomography (CT), magnetic resonance imaging (MRI), positron emission tomography (PET), and other modalities.

DISCUSSION OF THE RELATED ART

The diagnostically superior information available from data acquired from current imaging systems enables the detection of potential problems at earlier and more treatable stages. Given the vast quantity of detailed data acquirable from imaging systems, various algorithms must be developed to efficiently and accurately process image data. With the aid of computers, advances in image processing are generally performed on digital or digitized images.

Digital images are created from an array of numerical values representing a property (such as a grey scale value or magnetic field strength) associable with an anatomical location points referenced by a particular array location. The set of anatomical location points comprises the domain of the image. In 2-D digital images, or slice sections, the discrete array locations are termed pixels. Three-dimensional digital images can be constructed from stacked slice sections through various construction techniques known in the art. The 3-D images are made up of discrete volume elements, also referred to as voxels, composed of pixels from the 2-D images. The pixel or voxel properties can be processed to ascertain various properties about the anatomy of a patient associated with such pixels or voxels. Computer-aided diagnosis ("CAD") systems play a critical role in the analysis and visualization of digital imaging data.

The efficient visualization of volumetric datasets is important for many applications, including medical imaging, finite element analysis, mechanical simulations, etc. The 3-dimensional datasets obtained from scanning modalities such as computed tomography (CT), magnetic resonance imaging (MRI), positron emission tomography (PET), ultrasound (US), etc., are usually quite complex, and contain many different objects and structures. In many instances, it is difficult to distinguish between two different objects that have similar intensity values in the imaged data. In other cases, the region of interest to the user is surrounded either partially or completely by other objects and structures. There is often a need to either remove an obstructing surrounding object, or to keep the region of interest and remove all other objects.

Segmentation refers to the process of partitioning the digital image into multiple regions. Image segmentation is typically used to locate objects and boundaries (lines, curves, etc.) in images. The result of image segmentation is a set of regions that collectively cover the entire image, or a set of contours extracted from the image. Each of the pixels in a region are similar with respect to some characteristic or computed property, such as color, intensity, or texture, while adjacent regions are significantly different with respect to the same characteristic(s). Some of the applications of image segmentation in medical imaging are locating tumors and other pathologies, locating organs, measuring tissue volumes, computer-guided surgery, computer-aided diagnosis, and treatment planning. Automatic or semi-automatic organ segmentation in medical images remains generally an unsolved task, although many different approaches have been suggested in the literature. Various techniques often have to be combined with domain knowledge in order to effectively segment an image for a particular domain.

SUMMARY OF THE INVENTION

Exemplary embodiments of the invention as described herein generally include methods and systems for finding characteristic surface features on an organ, features characterizing local appearance of the organ tissue and the neighboring structures and then fitting the model organ shape to the test image using these features. According to an embodiment of the invention, an active shape model approach is used to fit the model shape to the organ surface using local estimations of similarity in appearance, surface curvature and other characteristics (computed as features) of the sample organ surfaces in a training set.

According to an aspect of the invention, there is provided a method for segmenting organs in digitized medical images, the method including providing a set of training images of an object of interest, where the object of interest has been segmented, computing a surface mesh having a plurality of mesh cells that approximates a border of the object of interest, extracting positive examples of all mesh cells and extracting negative examples in the neighborhood of each mesh cell which do not belong to the object surface, training from the positive examples and negative examples a plurality of classifiers for outputting a probability of a point being a center of a particular mesh cell, computing an active shape model using a robust subset of center points in the mesh cells, generating a new shape by iteratively deforming the active shape model to fit a test image, and using the classifiers to calculate a probability of each center point of the new shape being a center of a particular mesh cell which the classifier was trained to recognize.

According to a further aspect of the invention, the method includes aligning the images.

According to a further aspect of the invention, the method includes computing a bounding box about the object of interest that is a smallest box that contains all points belonging to the object of interest, where the surface mesh is computed within the bounding box.

According to a further aspect of the invention, a number of mesh nodes of the surface mesh is constant for all sample images.

According to a further aspect of the invention, the object of interest is an organ.

According to a further aspect of the invention, the robust subset of the mesh cells is determined by maximizing $$\operatorname*{argmax}_{w}\left(\alpha \sum_{i}^{n} \sum_{j}^{m} w_i g_{ij} + \beta \sum_{i}^{n} w_i \bar{C}_i\right), g_{ij} < D,$$

where $g_{ij}$ is a geodesic distance between centers of mesh cells i and j, D is a maximum distance between mesh cells, $\bar{C}_i$ is an average classification accuracy of the classifier for mesh cell i, α and β are adjustable parameters that can trade-off between sparsity and classification accuracy, and $w_i$ is a resulting weight of mesh cell i.

According to a further aspect of the invention, the classifier is trained using positive and negative examples from the robust subset of mesh cells and their neighborhood.

According to a further aspect of the invention, the method includes aligning the active shape model with an object of interest in a new image.

According to a further aspect of the invention, extracting positive and negative examples from the surface mesh comprises finding matching mesh cells on all surfaces in the training set for each mesh cell, selecting a set of center points in corresponding mesh cells in all images as positive examples, and selecting high gradient points that do not belong to the organ border within a predefined neighborhood of each mesh cell as negative examples.

According to another aspect of the invention, there is provided a method for segmenting organs in digitized medical images, including providing a set of training images of an object of interest, where the object of interest has been segmented, computing a surface mesh having a plurality of cells that approximates a border of the object of interest, extracting border points from within each mesh cell, extracting image features from the border points that are positive examples of a point being in a mesh cell, extracting image features from neighborhoods of the border points that are negative examples of a point being in a mesh cell, training from the positive examples and negative examples a plurality of classifiers for outputting a probability of a point being a center of a particular mesh cell, and using the classifiers to calculate a probability of a center point of a new shape being a center of a particular mesh cell.

According to a further aspect of the invention, the method includes computing an active shape model having a mean shape from a subset of the mesh cells; aligning the mean shape with an object of interest in a new image and deforming the mean shape by a linear combination of eigenvectors and a model parameter vector to generate a new shape that models a surface of the object of interest in the new image.

According to a further aspect of the invention, the positive and negative image feature examples include shape and appearance, such as an intensity gradient, an intensity inside and outside the border of the object of interest, texture inside and outside the border, a mean and Gaussian curvature, curvedness, sphericity, and a surface classification.

According to a further aspect of the invention, the positive and negative image feature examples are calculated in a direction orthogonal to the surface mesh by calculating, for each mesh cell around a center point of the cell, a median value, average value, standard deviation, and higher order moments of the features are extracted within several vicinity sizes around the mesh cell center point.

According to another aspect of the invention, there is provided a program storage device readable by a computer, tangibly embodying a program of instructions executable by the computer to perform the method steps for segmenting organs in digitized medical images.

DETAILED DESCRIPTION OF EXEMPLARY EMBODIMENTS

Figure 1:
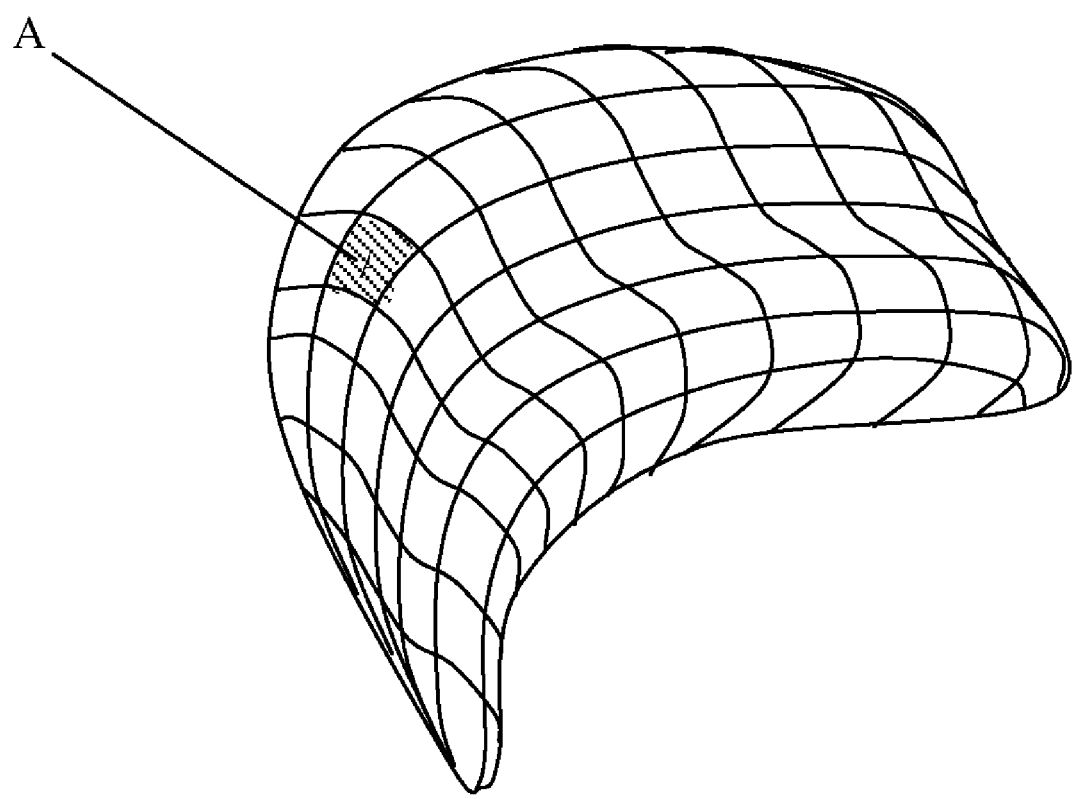
FIG. 1 depicts an exemplary mesh cell "A" on an organ surface, according to an embodiment of the invention.

Exemplary embodiments of the invention as described herein generally include systems and methods for organ segmentation using surface patch classification in 2D and 3D images. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives failing within the spirit and scope of the invention.

As used herein, the term "image" refers to multi-dimensional data composed of discrete image elements (e.g., pixels for 2-D images and voxels for 3-D images). The image may be, for example, a medical image of a subject collected by computer tomography, magnetic resonance imaging, ultrasound, or any other medical imaging system known to one of skill in the art. The image may also be provided from non-medical contexts, such as, for example, remote sensing systems, electron microscopy, etc. Although an image can be thought of as a function from $R^3$ to R, the methods of the inventions are not limited to such images, and can be applied to images of any dimension, e.g., a 2-D picture or a 3-D volume. For a 2- or 3-dimensional image, the domain of the image is typically a 2- or 3-dimensional rectangular array, wherein each pixel or voxel can be addressed with reference to a set of 2 or 3 mutually orthogonal axes. The terms "digital" and "digitized" as used herein will refer to images or volumes, as appropriate, in a digital or digitized format acquired via a digital acquisition system or via conversion from an analog image.

Figure 2:
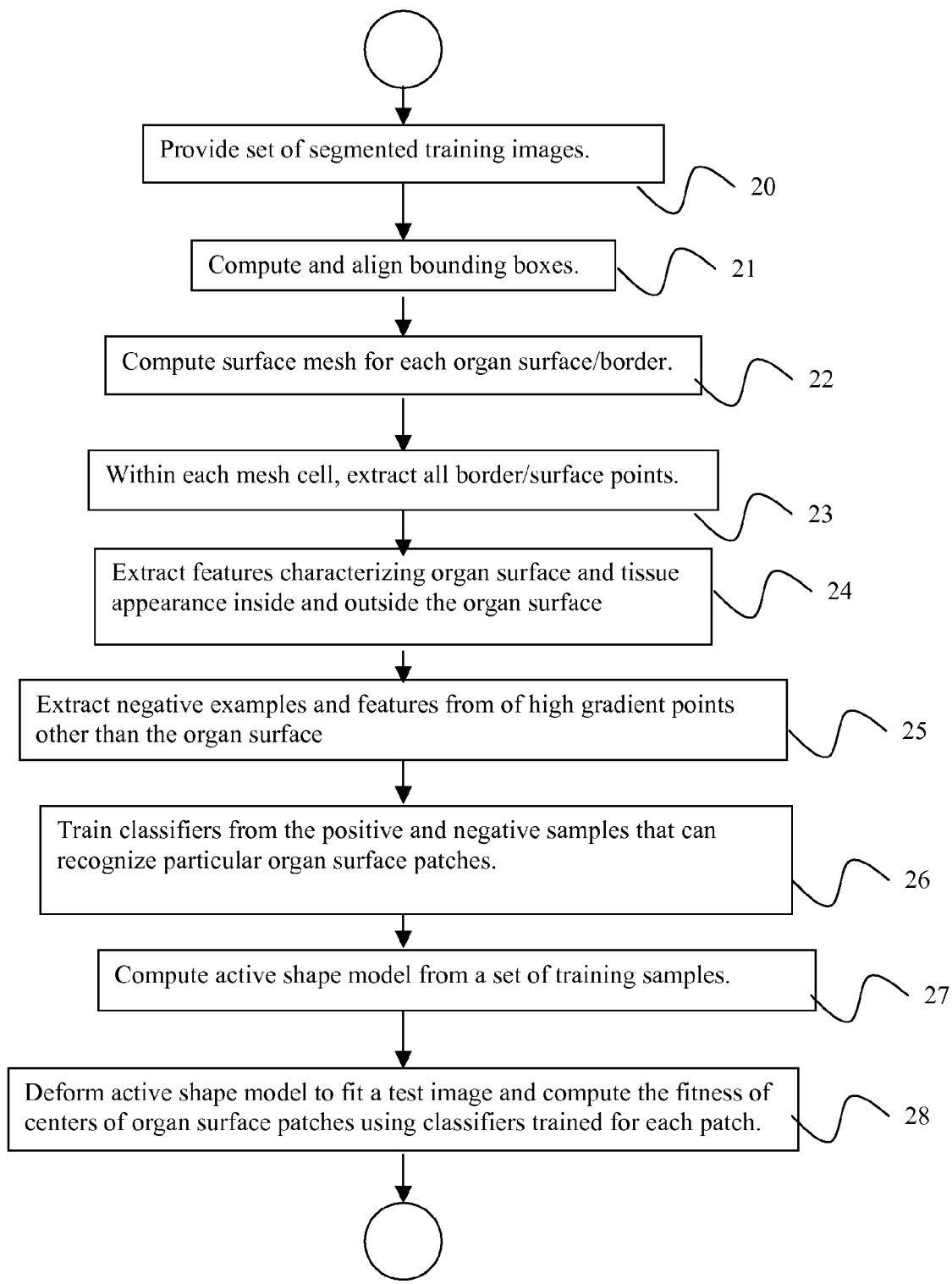
FIG. 2 is a flowchart of a method for organ segmentation using surface patch classification in 2D and 3D images, according to an embodiment of the invention.

FIG. 2 is a flowchart of a method for organ segmentation using surface patch classification in 2D and 3D images, according to an embodiment of the invention. A segmentation method according to an embodiment of the invention begins at step 20 by acquiring 2D or 3D images of an organ of interest from the same or similar imaging modalities. Some examples of a sample image set are: (1) computed tomography (CT) images with or without contrast; (2) magnetic resonance (MR) images of a same or similar pulse sequence, (3) positron emission tomography (PET) images. The organ of interest and nearby structures should appear similar in these pulse sequences, for example, like the spinal cord appears similar in STIR (Short tau inversion recovery) and HASTE (half-Fourier acquisition single-shot turbo spin echo) pulse sequences. (A manual or semi-automatic segmentation of the organ of interest should be acquired for each of the sample images.

All sample images should be either acquired at the same orientation or transformed to the same orientation. The sample images can be either 2-dimensional (2D) or 3-dimensional (3D). A bounding box is computed at step 21 for each sample outlined organ as the smallest box containing all voxels belonging to the organ. An affine coordinate transformation, including scale, rotation and translation, is applied to transform all of the sample images such that all the bounding boxes containing the organ of interest are precisely aligned. A set of reference points chosen to be easily detectable manually or by an automatic algorithm could be used for this purpose. These reference points are used to align all the sample organs in the training set with one of the images chosen as a model via a coordinate transformation that minimizes the squared distance between the transformed reference points in each image and the corresponding reference points in the model.

Within the bounding box, a surface mesh is computed for each organ border at step 22. The surface mesh could be triangulated or polygonal. The number of mesh nodes should be constant for all sample images, so that organs of different sizes have the same number of mesh nodes on their surface. Within each mesh cell A on the surface, also referred to herein as surface patches, extract all outlined or interpolated border or surface points. An exemplary mesh cell "A" on an organ surface is depicted in FIG. 1.

At step 23, image features are extracted from in and around the border points. Image features can include shape and appearance, such as the intensity gradient, the intensity inside and outside the contour, texture inside and outside the contour, two principle curvatures, mean and Gaussian curvature, curvedness, sphericity, surface classification (elliptical peak or pit, saddle point, plane, etc.). Features inside and outside of the organ surface are computed on a ray in the direction orthogonal to the surface. For each surface patch around a center point of the patch, median values, average values, standard deviations and higher order moments of these features are extracted within several vicinity sizes around the patch center point. The largest vicinity size should be chosen such that the largest vicinities used for feature computation of neighboring patches overlap. Different vicinity sizes around each border point are used for feature computation to reflect shape and appearance pattern at different scales.

Matching patches are found at step 24 on all sample organ surfaces for each surface patch. For a sample patch A, the set of center points in corresponding patches in all sample images will represent a true positive example set of the area A in the organ surface. Negative examples can be similarly obtained at step 25 from other high gradient points in the image within a predefined neighborhood of the mesh cell A, for example a neighborhood of size $S \times N^3$, where S is the average area of the surface patch. The same feature set is extracted from the negative examples of high gradient points that do not belong to the organ surface.

For each mesh cell or area A, a classifier is trained at step 26 using the image features obtained from the corresponding mesh cells in all of the sample images. The goal of each classifier is to recognize a particular patch on the organ surface in all sample images. The classifier can be any classifier as is known in the art, such as a support vector machine, linear or quadratic discriminate analysis classifiers, etc. The output of the classifier i is the probability of a particular point being a center of patch i. Not all the surface patches can be used as equally robust characteristics of a particular organ, as some represent individual variations due to a pathology that could be rarely seen in other patients, or simply a part of an organ surface with highly variable appearance. To robustly represent the shape and appearance of the organ and minimize amount of computation required, only the most representative patches whose appearance is stable across the sample image set should be used to train the classifier.

A sparse selection of the most robust surface patches could be obtained by finding a vector of weights w that maximizes the following:

$$\operatorname*{argmax}_{w} \left( \alpha \sum_{i}^{n} \sum_{j}^{m} w_i g_{ij} + \beta \sum_{i}^{n} w_i \overline{C}_i \right), g_{ij} < D$$

where $g_{ij}$ is a geodesic distance between centers of patches i and j, D is the maximum distance between surface patches, $\overline{C}_i$ is an average classification accuracy of classifier i, determined via cross-validation, α and β are parameters that can be tuned to trade-off between sparsity of the solution and classification accuracy, and $w_i$ is the resulting weight of patch i.

An active shape model is computed at step 27 using sample points in the center of each patch with non-zero weight, or where $w_i$>T, where T is an empirically defined threshold. A set of reference points (not necessarily coinciding with the selected patches or their centers) is chosen to be easily detectable either manually or by an automatic algorithm. These reference points are used to align the mean shape computed from sample organs in our training set with an organ in a new test image. Next, using the center points $x_i$ of all patches where $w_i$>T, denotes as $X=[x_1, \ldots, x_m]^T$, the mean shape can be computed as $$\overline{x} = \frac{1}{m} \sum_{j=1}^{m} x_j,$$

where $x_j$ is a vector of coordinates of each patch center point j, and m is the number of training samples satisfying the threshold criteria.

A new shape can be generated by deforming the mean shape by a linear combination of eigenvectors:

$$x = \overline{x} + Pd,$$

where $P=(p_1, \ldots, p_t)$ is a matrix of t eigenvectors, $d=(d_1, \ldots, d_t)^T$ is the model parameter vector, and t is the number of modes.

At step 28, for each iteration of warping the active shape model to the actual image, the fitness of all prospective test organ patch center points corresponding to each patch center on the mean shape is computed as the output of the probabilistic classifier i previously trained to 'recognize' each particular patch. The output of the classifier i is the probability of a particular point being a center of patch i. As a result, the active shape model will deform to fit those surface patches most similar in appearance, surface curvature and other characteristics, computed as features, to the sample organ surface patches from the training set. Model constraints can be used to prevent unrealistic deformations. Note that many different classification approaches and modifications of active shape method could be used here.

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 3:
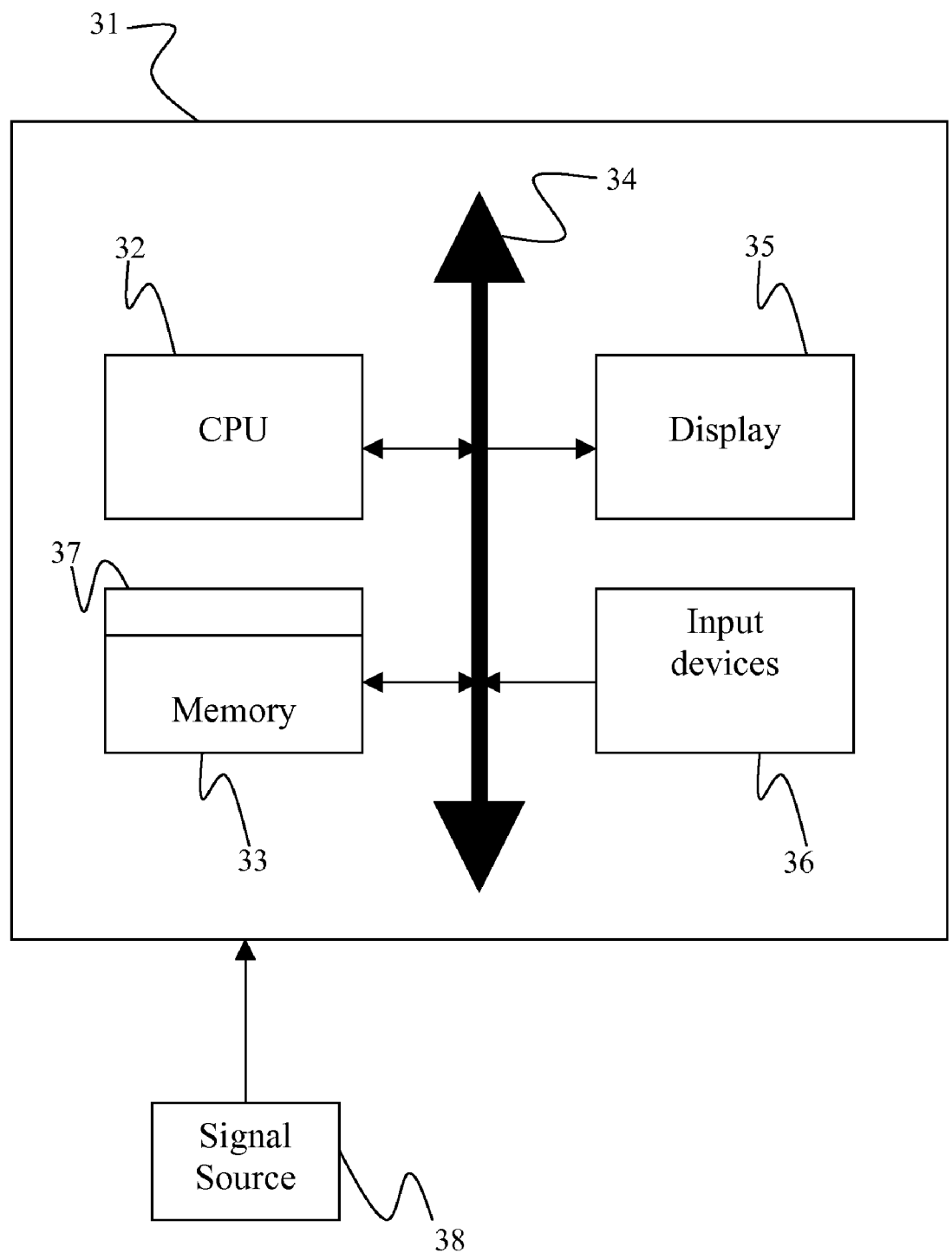
FIG. 3 is a block diagram of an exemplary computer system for implementing a method for organ segmentation using surface patch classification in 2D and 3D images, according to an embodiment of the invention.

FIG. 3 is a block diagram of an exemplary computer system for implementing a method for organ segmentation using surface patch classification in 2D and 3D images according to an embodiment of the invention. Referring now to FIG. 3, a computer system 31 for implementing the present invention can comprise, inter alia, a central processing unit (CPU) 32, a memory 33 and an input/output (I/O) interface 34. The computer system 31 is generally coupled through the I/O interface 34 to a display 35 and various input devices 36 such as a mouse and a keyboard. The support circuits can include circuits such as cache, power supplies, clock circuits, and a communication bus. The memory 33 can include random access memory (RAM), read only memory (ROM), disk drive, tape drive, etc., or a combinations thereof. The present invention can be implemented as a routine 37 that is stored in memory 33 and executed by the CPU 32 to process the signal from the signal source 38. As such, the computer system 31 is a general purpose computer system that becomes a specific purpose computer system when executing the routine 37 of the present invention.

The computer system 31 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to a preferred embodiment, those skilled in the art will appreciate that various modifications and substitutions can be made thereto without departing from the spirit and scope of the invention as set forth in the appended claims.

What is claimed is:

1. A method for segmenting organs in digitized medical images, the method comprising:
using a computer to perform steps comprising:
providing a set of training images of an object of interest, wherein said object of interest has been segmented;
computing a surface mesh having a plurality of mesh cells that approximates a border of said object of interest;
extracting positive examples of all mesh cells and extracting negative examples in the neighborhood of each mesh cell which do not belong to the object surface;
training from said positive examples and negative examples a plurality of classifiers for outputting a probability of a point being a center of a particular mesh cell;
computing an active shape model using a robust subset of center points in said mesh cells;
wherein said robust subset of said mesh cells is determined by maximizing $$\underset{w}{\operatorname{argmax}}\left(\alpha \sum_{i}^{n} \sum_{j}^{m} w_{i} g_{i j}+\beta \sum_{i}^{n} w_{i} \overline{C}_{i}\right),$$

$g_{ij}<D$, wherein $g_{ij}$ is a geodesic distance between centers of mesh cells i and j, D is a maximum distance between mesh cells, $\overline{C}_i$ is an average classification accuracy of said classifier for mesh cell i, $\alpha$ and $\beta$ are adjustable parameters that can trade-off between sparsity and classification accuracy, and $w_i$ is a resulting weight of mesh cell i;
generating a new shape by iteratively deforming said active shape model to fit a test image; and
using said classifiers to calculate a probability of each center point of said new shape being a center of a particular mesh cell which said classifier was trained to recognize.

2. The method of claim 1, further comprising aligning said images.

3. The method of claim 1, further comprising computing a bounding box about said object of interest that is a smallest box that contains all points belonging to the object of interest, wherein said surface mesh is computed within the bounding box.

4. The method of claim 1, wherein a number of mesh nodes of said surface mesh is constant for all sample images.

5. The method of claim 1, wherein said object of interest is an organ.

6. The method of claim 1, wherein said classifier is trained using positive and negative examples from said robust subset of mesh cells and their neighborhood.

7. The method of claim 1, further comprising aligning said active shape model with an object of interest in a new image.

8. The method of claim 1, wherein extracting positive and negative examples from said surface mesh comprises finding matching mesh cells on all surfaces in said training set for each mesh cell, selecting a set of center points in corresponding mesh cells in all images as positive examples, and selecting high gradient points that do not belong to the organ border within a predefined neighborhood of each mesh cell as negative examples.

9. A program storage device readable by a computer, tangibly embodying a program of instructions executable by the computer to perform the method steps for segmenting organs in digitized medical images, the method comprising the steps of:
providing a set of training images of an object of interest, wherein said object of interest has been segmented;
computing a surface mesh having a plurality of mesh cells that approximates a border of said object of interest;
extracting positive examples of all mesh cells and extracting negative examples in the neighborhood of each mesh cell which do not belong to the object surface;
training from said positive examples and negative examples a plurality of classifiers for outputting a probability of a point being a center of a particular mesh cell;
computing an active shape model using a robust subset of center points in said mesh cells;
wherein said robust subset of said mesh cells is determined by maximizing $$\underset{w}{\operatorname{argmax}}\left(\alpha \sum_{i}^{n} \sum_{j}^{m} w_{i} g_{i j}+\beta \sum_{i}^{n} w_{i} \overline{C}_{i}\right),$$

$g_{ij}<D$, wherein $g_{ij}$ is a geodesic distance between centers of mesh cells i and j, D is a maximum distance between mesh cells, $\overline{C}_i$ is an average classification accuracy of said classifier for mesh cell i, $\alpha$ and $\beta$ are adjustable parameters that can trade-off between sparsity and classification accuracy, and $w_i$ is a resulting weight of mesh cell i;

generating a new shape by iteratively deforming said active shape model to fit a test image; and using said classifiers to calculate a probability of each center point of said new shape being a center of a particular mesh cell which said classifier was trained to recognize.

10. The computer readable program storage device of claim 9, the method further comprising aligning said images.

11. The computer readable program storage device of claim 9, the method further comprising computing a bounding box about said object of interest that is a smallest box that contains all points belonging to the object of interest, wherein said surface mesh is computed within the bounding box.

12. The computer readable program storage device of claim 9, wherein a number of mesh nodes of said surface mesh is constant for all sample images.

13. The computer readable program storage device of claim 9, wherein said object of interest is an organ.

14. The computer readable program storage device of claim 9, wherein said classifier is trained using positive and negative examples from said robust subset of mesh cells and their neighborhood.

15. The computer readable program storage device of claim 9, the method further comprising aligning said active shape model with an object of interest in a new image.

16. The computer readable program storage device of claim 9, wherein extracting positive and negative examples from said surface mesh comprises finding matching mesh cells on all surfaces in said training set for each mesh cell, selecting a set of center points in corresponding mesh cells in all images as positive examples, and selecting high gradient points that do not belong to the organ border within a predefined neighborhood of each mesh cell as negative examples.

* * * * *